United States Patent
Shen et al.

(10) Patent No.: US 11,417,869 B2
(45) Date of Patent: Aug. 16, 2022

(54) LITHIUM ION SECONDARY BATTERY

(71) Applicant: Contemporary Amperex Technology Co., Limited, Ningde (CN)

(72) Inventors: Rui Shen, Ningde (CN); Jianjun Ma, Ningde (CN); Libing He, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 17/013,734

(22) Filed: Sep. 7, 2020

(65) Prior Publication Data

US 2020/0411902 A1 Dec. 31, 2020

Related U.S. Application Data

(63) Continuation of application No. 15/846,869, filed on Dec. 19, 2017, now abandoned.

(30) Foreign Application Priority Data

Sep. 6, 2017 (CN) .......................... 201710795465.4

(51) Int. Cl.
| | |
|---|---|
| *H01M 4/133* | (2010.01) |
| *H01M 10/0525* | (2010.01) |
| *H01M 4/525* | (2010.01) |
| *H01M 4/583* | (2010.01) |
| *H01M 4/485* | (2010.01) |
| *H01M 4/62* | (2006.01) |
| *H01M 4/505* | (2010.01) |
| *H01M 4/587* | (2010.01) |
| *H01M 4/02* | (2006.01) |
| *H01M 4/131* | (2010.01) |

(52) U.S. Cl.
CPC .......... *H01M 4/133* (2013.01); *H01M 4/485* (2013.01); *H01M 4/505* (2013.01); *H01M 4/525* (2013.01); *H01M 4/583* (2013.01); *H01M 4/587* (2013.01); *H01M 4/626* (2013.01); *H01M 10/0525* (2013.01); *H01M 4/131* (2013.01); *H01M 2004/021* (2013.01); *H01M 2004/027* (2013.01); *H01M 2004/028* (2013.01)

(58) Field of Classification Search
CPC ............................. H01M 4/133; H01M 4/525
USPC ..................................... 429/231.95
See application file for complete search history.

(56) References Cited

U.S. PATENT DOCUMENTS

| | | | | |
|---|---|---|---|---|
| 5,888,430 A | * | 3/1999 | Wakayama | H01M 4/38 252/503 |
| 2006/0078796 A1 | | 4/2006 | Ozaki et al. | |
| 2016/0190552 A1 | * | 6/2016 | Murata | H01M 4/364 429/231.8 |
| 2017/0200944 A1 | * | 7/2017 | Hwang | H01M 4/131 |

FOREIGN PATENT DOCUMENTS

| | | |
|---|---|---|
| CN | 101685878 A | 3/2010 |
| CN | 102315478 A | 1/2012 |
| CN | 103441305 A | 12/2013 |
| CN | 103606648 A | 2/2014 |
| CN | 104518206 A | 4/2015 |
| CN | 105453314 A | 3/2016 |
| CN | 106252662 A | 12/2016 |
| CN | 106972154 A | 7/2017 |
| JP | 2014026991 A | 2/2014 |

OTHER PUBLICATIONS

The second Official Action and search report dated Aug. 12, 2020 for Chinese application No. 201710795465.4, 19 pages.
The Third Office Action for Chinese Application No. 201710795465.4, dated Feb. 2, 2021, 10 pages.
The Preparation of Carbonaceous Microspheres and Its Application as High Performance Anode Material for LIBs, written by Jin Wang et.al., dated Dec. 25, 2011, 8 pages.
The Notification to Grant Patent Right for Invention and search report for Chinese Application No. 201710795465.4, dated May 7, 2021, 5 pages.
The Tin-Metal-Carbon Composite Anode Materials for Lithium Ion Batteries, written by Haowen Meng et.al., dated Aug. 7, 2015, 13 pages.

* cited by examiner

*Primary Examiner* — James M Erwin
(74) *Attorney, Agent, or Firm* — Law Offices of Liaoteng Wang

(57) ABSTRACT

The present application relates to a lithium ion secondary battery comprising a cathode, an anode, a separator and an electrolyte; wherein the cathode comprises a positive current collector and a positive material layer, wherein the positive material layer comprises a positive active material with a formula $Li_xNi_aCo_bM_cO_2$, M is at least one selected from Mn and Al, $0.95 \leq x \leq 1.2$, $0<a<1$, $0<b<1$, $0<c<1$ and $a+b+c=1$; wherein the anode comprises a negative current collector and a negative material layer, wherein the negative material layer comprises graphite having a graphitization degree of 92% to 98% and an average particle size D50 of 6 μm to 18 μm as negative active material. The lithium ion secondary battery has long cycle life and high energy density.

8 Claims, No Drawings

LITHIUM ION SECONDARY BATTERY

CROSS-REFERENCE TO RELATED APPLICATION

This application is a continuation of U.S. patent application Ser. No. 15/846,869, filed on Dec. 19, 2017, which claims priority to Chinese Patent Application No. 201710795465.4 filed on Sep. 6, 2017, the entire content of each of which is incorporated herein by reference.

TECHNICAL FIELD

The present application relates to the field of batteries, and more particularly, to a lithium ion secondary battery.

BACKGROUND

With the growing popularity of electric vehicles, the requirements of the battery are stricter, such as the battery is required to be both small and light and must also have high capacity, long cycle and stable performance. To this end, the technical persons have made a variety of efforts from the cathode and anode, electrolytes of battery and so on.

For example, with respect to positive active material for a battery, NCM has a higher capacity and density compared to lithium ion phosphate (LFP). Therefore, a cell using NCM has a higher energy density. However, unlike LFP that the volume thereof will shrinkage when it charges, the volume of NCM will expand when it charges; the expansion force will damage the interface between anode and cathode, and cause the battery failure. Therefore, despite the higher energy density, the cycle life of ternary battery is often worse than that of lithium ion phosphate battery.

Therefore, it is still a great challenge to match right positive active material with right negative active material in order to improve battery performance.

In view of this, it is necessary to provide a battery with good performance.

SUMMARY

An object of the present application is to provide a lithium ion secondary battery having comprehensive and balanced performance.

A further object of the present application is to provide a lithium ion secondary battery capable of providing both long cycle life and high energy density without sacrificing the energy density of the batteries.

The inventors have experimented with a large number of experiments to surprisingly find that a particular type of positive active material and negative active material for battery can be combined to improve the cycle life and energy density of the lithium ion secondary battery at the same time.

In particular, the present application provides a lithium ion secondary battery comprising a cathode, an anode, a separator and an electrolyte;

wherein the cathode comprises a positive current collector and a positive material layer, wherein the positive material layer comprises a positive active material with formula $Li_xNi_aCo_bM_cO_2$, M is at least one selected from the group consisting of Mn and Al, $0.95 \leq x \leq 1.2$, $0<a<1$, $0<b<1$, $0<c<1$ and $a+b+c=1$;

wherein the anode comprises a negative current collector and a negative material layer, wherein the negative material layer comprises graphite having a graphitization degree of 92% to 98% and an average particle size D50 of 6 μm to 18 μm as negative active material.

Compared with the prior art, the lithium ion secondary battery provided by the present application can have both long cycle life and high energy density by using a specific positive and negative active material.

The present application also relates to a method for producing the lithium ion secondary battery, comprising:

1) preparing a cathode by using a positive active material with formula $Li_xNi_aCo_bM_cO_2$, wherein M is at least one selected from the group consisting of Mn and Al, $0.95 \leq x \leq 1.2$, $0<a<1$, $0<b<1$, $0<c<1$ and $a+b+c=1$;

2) preparing an anode by using graphite having a graphitization degree of 92% to 98% and an average particle size D50 of 6 μm to 18 μm as negative active material; and 3) assembling the cathode prepared in step 1) and the anode prepared in step 2) into a battery.

DETAILED DESCRIPTION

The present application will be described in further details with reference to the embodiments and the accompanying drawings in order to make the objects, the technical solutions and the advantageous technical effects of the present application clearer. It is to be understood, however, that the embodiments of the application are merely for the purpose of explaining the application and are not intended to be limiting the application, and that the embodiments of the application are not limited to the embodiments given in the specification. The experimental conditions not specified in the examples are given according to conventional conditions, or according to the conditions recommended by the material supplier.

The present application provides a lithium ion secondary battery comprising a cathode, an anode, a separator and an electrolyte, wherein the cathode comprises a positive current collector and a positive material layer, wherein the positive material layer comprises a positive active material with formula $Li_xNi_aCo_bM_cO_2$, M is at least one selected from the group consisting of Mn and Al, $0.95 \leq x \leq 1.2$, $0<a<1$, $0<b<1$, $0<c<1$ and $a+b+c=1$;

wherein the anode comprises a negative current collector and a negative material layer, wherein the negative material layer comprises graphite having a graphitization degree of 92% to 98% and an average particle size D50 of 6 μm to 18 μm as negative active material.

The inventors believe that the graphite having a graphitization degree of 92% to 98% and an average particle diameter of D50 of 6 μm to 18 μm can form a high elastic structure inside the material, and has a higher elasticity than the conventional graphite material. When charging the positive active material will expand, and this will result in that the extrusion force to the anode increases. However, the use of the above-mentioned high elastic graphite will make the anode has a strong restoring ability after bearing a large pressure, so that the contact surface between the anode material remains intact, to avoid material interface damage and stripping phenomenon caused by the expansion, which will improve the battery cycle performance without loss of energy density. However, the above explanation is provided for the purpose of facilitating to understand the principles of the present application by those skilled in the art and is not to be construed as limiting the application. The present application does not preclude the possibility that other principles may be made with the development of technology.

The inventors have further found that the higher the graphitization degree of the graphite is, the higher the battery capacity will be, but a too high graphitization degree will lead to the narrowing of the interlayer distance of the graphite, and the volume change caused by the lithium ion deintercalation during charging and discharging will be great, which will impact the stability of SEI layer. If the graphitization degree is too low, the crystallinity of graphite is low, and lattice defects will be more, thus in the process of cycling side effects are prone to occur and it will lead to capacity attenuation. Through a large number of experiments, the inventors found that the graphitization degree from 92% to 98% is just right, preferably from 92% to 96%.

The inventors have further found that when the D50 of the graphite is more than 18 μm, it will cause the number of the stacking layers of the particles less, and it is difficult to form an elastic structure. When the D50 is less than 6 μm, the bonding force between materials is too weak, thus the adhesion to the electrode plate will be poor, during the cycle stripping phenomenon is prone to occur and it will lead to capacity attenuation. Therefore, the graphite should have an average particle size D50 of 6 μm to 18 μm, preferably 6 μm to 12 μm.

In order to further improve rate performance, the surface of the graphite may also have a coating layer. The coating layer is usually an amorphous carbon, for example, at least one selected from the group consisting of carbon black, coke, soft carbon and hard carbon. The content of the amorphous carbon relative to the total weight of the electrode material is generally from 2% to 13%, preferably from 5 to 10%. In some embodiments, the amorphous carbon is obtained by (high temperature) carbonization of at least one material selected from the group consisting of polyvinyl butyral, bitumen, furfural resin, epoxy resin or phenolic resin.

The lithium ion secondary battery which comprises specific positive material and specific negative material above-mentioned can be prepared by a method known in the field, such as following:

1. Preparation of Cathode

In general, the positive active material, the conductor, the binder are mixed in a certain weight ratio, then the solvent is added and the mixture is stirred under the action of a vacuum stirrer into a uniform transparent state to obtain a positive material slurry; coat the positive current collector with the positive material slurry; then dry it and slit to obtain a cathode.

The positive active material used in the present application is $Li_xNi_aCo_bM_cO_2$, wherein M is at least one selected from the group consisting of Mn and Al, $0.95 \leq x \leq 1.2$, $0<a<1$, $0<b<1$, $0<c<1$ and $a+b+c=1$. When M is Mn, the formula of the material is abbreviated as NCM; when M is Al, the formula of the material is abbreviated as NCA. The materials can be purchased from suppliers.

Specifically, the positive active material may be at least one selected from the group consisting of $LiNi_{0.33}Co_{0.33}Mn_{0.33}O_2$, $LiNi_{0.5}Co_{0.2}Mn_{0.3}O_2$, $LiNi_{0.5}Co_{0.25}Mn_{0.25}O_2$, $LiNi_{0.6}Co_{0.2}Mn_{0.2}O_2$, $LiNi_{0.8}Co_{0.1}Mn_{0.1}O_2$, $LiNi_{0.85}Co_{0.1}Mn_{0.05}O_2$ and $LiNi_{0.8}Co_{0.15}Al_{0.05}O_2$.

In a preferred embodiment of the present application, the content of the positive active material is 92% to 98% by weight based on the total weight of the positive material layer.

In some embodiments of the present application, the positive active material may also be doped with at least one element selected from the group consisting of Al, Zr, Ti, B, Mg, V, Cr, F, in order to further improve the battery performance.

In some embodiments of the present application, forming a coating layer on the outside of the crystal of the positive active material may further improve the battery performance, and the coating layer may contain for example at least one of Al, Zr, Ti and B elements.

2. Preparation of Anode

1) Preparing the Negative Material

In the present application, a graphite having a graphitization degree of 92% to 98% and an average particle size D50 of 6 μm to 18 μm is used as the negative active material. In the present application, the "graphite" has the meaning which is well understood by those skilled in the art, and is a carbon material suitable as the battery negative material which mainly has the form of a graphite sheet in the interior. The graphite may be natural graphite, artificial graphite, or a mixture thereof. The graphite used in the present application having a graphitization degree of 92% to 98% and an average particle size D50 of 6 μm to 18 μm can be prepared, for example, by the following method:

(A) crushing the calcined petroleum needle-coke or calcined coal needle-coke to obtain the raw materials having an average particle size of 5-20 μm;

(B) subjecting the raw material obtained in step (A) to a shaping treatment and then subjecting to a classification treatment to adjust the particle size distribution of the raw material (preferably, large particles having a particle size larger than D90 and small particles having a particle size smaller than D10 are removed);

(C) sieving the raw material obtained in step (B) and then subjecting it to high-temperature graphitization, for example, in an Acheson graphitizing furnace at a temperature of, for example, 2800° C. to 3250° C. (preferably 2850° C. to 3200° C.);

(D) sieving and demagnetizing the material obtained in step (C), to obtain the desired negative material.

The shaping treatment in step (B) is a conventional treatment method in the preparation process of artificial graphite, which is well known to those skilled in the art and can be carried out by using any shaping machine or other shaping device commonly used in the art. The classification treatment in step (B) can be carried out by using a classification screen (sieving method), a gravity classifier, a centrifugal separator or the like. Optionally, after step (C) the coating carbonization step may be carried out prior to step (D), i.e. the product obtained in step (C) is mixed with at least one material selected from the group consisting of polyvinyl butyral, bitumen, furfural resin, epoxy resin or phenolic resin and subjected to high-temperature carbonization treatment. The temperature of the carbonization treatment is, for example, 900-1500° C., for example 1000-1400° C. or 1100-1300° C.

Alternatively, the present application may also use a natural graphite or commercially available graphite having a graphitization degree of 92% to 98% and an average particle size D50 of 6 μm to 18 μm.

The graphitization degree of the graphite can be determined by methods known in the field, for example by X-ray diffractometer (reference, for example, Qian Chongliang et al., "Graphitization Measurement of Carbon Material by X-ray Diffraction", Journal of Central South University of Technology, Vol. 32, No. 3, June 2001).

The average particle size D50 of the graphite can be conveniently determined by using a laser particle size analyzer (e.g., Malvern Master Size 2000).

2) Assembly of the Anode

In general, the negative active material, the thickener, the binder are mixed at a certain weight ratio; then the solvent is added to obtain the negative electrode slurry; then coat the negative current collector with the negative electrode slurry; then dry it and slit to obtain an anode.

In a preferred embodiment of the present application, the content of the negative active material is 92% to 98% by weight based on the total weight of the negative material layer.

3. Preparation of Electrolyte

As a non-aqueous electrolyte, a lithium salt solution dissolved in an organic solvent is usually used. Lithium salts are, for example, inorganic lithium salts such as $LiClO_4$, $LiPF_6$, $LiBF_4$, $LiAsb_6$, $LiSbF_6$; or organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3 (n \geq 2)$. The organic solvent used in the non-aqueous electrolyte is, for example, a cyclic carbonate such as ethylene carbonate, propylene carbonate, butylene carbonate and vinylene carbonate; or a chain carbonate such as dimethyl carbonate, diethyl carbonate and methyl ethyl carbonate; or a cyclic ester such as methyl propionate; or a chain ester such as γ-butyrolactone; or a chain ether such as dimethoxyethane, diethyl ether, diethylene glycol dimethyl ether and triethylene glycol dimethyl ether; or a cyclic ether such as tetrahydrofuran and 2-methyltetrahydrofuran; or nitriles such as acetonitrile and propionitrile; or a mixture of these solvents.

For example, ethylene carbonate (EC), methyl ethyl carbonate (EMC) and diethyl carbonate (DEC) were mixed according to a certain volume ratio, and then the sufficiently dried lithium salt $LiPF_6$ was dissolved in a mixed organic solvent to prepare an electrolyte.

4. Separator

There is no special requirement for the separator. In particularly, the separator may be selected from a polyethylene film, a polypropylene film, a polyvinylidene fluoride film, and a multilayer composite film thereof, depending on the actual requirements.

5. Preparation of Battery

Put the separator between the cathode and anode, then winding, jelly roll insertion, electrolyte injection and so on to obtain the lithium ion battery.

The advantageous effects of the present application will be further described below with reference to the following examples.

1. Material Preparation and Battery Assembly (1) The preparation of a cathode: $LiNi_{0.6}Co_{0.2}Mn_{0.2}O_2$, SuperP (conductive agent), PVDF (binder) were mixed at a mass ratio of 97:1:2, then a solvent was added. The mixture was stirred in a vacuum mixer into a uniform and transparent system, to obtain the positive electrode slurry. The positive electrode slurry was uniformly coated on the positive current collector aluminum foil; then the aluminum foil was dried at room temperature and then transferred to the oven for drying, and then the cathode was obtained by cold pressing and cutting.

(2) The preparation of an anode: artificial graphite anode active material samples were taken, and the particle size of the sample was measured by using Malvern Master Size 2000 laser particle size analyze, and the graphitization degree of the sample was measured by using X-ray diffractometer. The test results can be found from Table 1. The artificial graphite negative active material, sodium carboxymethyl cellulose (thickener) and SBR (styrene-butadiene rubber binder) were mixed at a mass ratio of 97:1.2:1.8, and deionized water was added, then under the action of a vacuum stirrer a negative electrode slurry was obtained. The negative electrode slurry was uniformly coated on the negative current collector copper foil; the copper foil was dried at room temperature and then transferred to the oven for drying, and then the anode was obtained by cold pressing and cutting.

(3) The preparation of an electrolyte: Ethylene carbonate (EC), methyl ethyl carbonate (EMC) and diethyl carbonate (DEC) were mixed at a volume ratio of 3:6:1, followed by dissolving the fully dried lithium salt $LiPF_6$ into a mixed organic solvent at a concentration of 1 mol/L to prepare an electrolyte.

(4) Separator: 12 micron PP/PE composite isolation film was used.

(5) The preparation of the full battery: the cathode, the separator, the anode were stacked in order, so that the separator was segregated between the cathode and anode, and then the stack was wound to obtain a bare cell; the bare cells were placed in the outer packaging shell. The prepared electrolyte was poured into dried bare cells, and the lithium ion battery was obtained by vacuum packaging, standing, chemical treatment, shaping and the like.

2. The Cycle Performance:

At 25° C., the battery was firstly charged and discharged as follows: constant current charging and constant voltage charging with a constant current of 1 C until the voltage upper limit of 4.2V, then constant current discharging with a constant current of 1 C until the final voltage of 2.8V, recording the discharge capacity of the first cycle. Charging/discharging cycles were done in such way.

Cycle capacity retention rate=(discharge capacity of the $n^{th}$cycle/discharge capacity at the first cycle)×100

Examples 2-12

Example 1 was repeated using different positive active materials and negative active materials. The parameters of the materials and the battery performance data were summarized in Table 1.

Comparative Examples 1-4

Example 1 was repeated using different positive active materials and negative active materials. The parameters of the materials and the battery performance data were summarized in Table 1.

TABLE 1

| Comparative example/Example | Graphitization degree of negative electrode | Average particle size of the negative material (μm) | Positive material | Dopant of the positive material | Coating of the positive material | Cycle capacity retention rate of 500$^{th}$ cycle | Cycle life (attenuation to 80%) |
|---|---|---|---|---|---|---|---|
| Example 1 | 94% | 6 | $LiNi_{0.6}Co_{0.2}Mn_{0.2}O_2$ | No | No | 95.70% | 2543 |
| Example 2 | 94% | 8 | $LiNi_{0.6}Co_{0.2}Mn_{0.2}O_2$ | No | No | 95.50% | 2422 |
| Example 3 | 94% | 12 | $LiNi_{0.6}Co_{0.2}Mn_{0.2}O_2$ | No | No | 95.10% | 2193 |
| Example 4 | 94% | 18 | $LiNi_{0.6}Co_{0.2}Mn_{0.2}O_2$ | No | No | 94.50% | 1998 |

TABLE 1-continued

| Comparative example/ Example | Graphitization degree of negative electrode | Average particle size of the negative material (μm) | Positive material | Dopant of the positive material | Coating of the positive material | Cycle capacity retention rate of 500$^{th}$ cycle | Cycle life (attenuation to 80%) |
|---|---|---|---|---|---|---|---|
| Example 5 | 92% | 8 | $LiNi_{0.6}Co_{0.2}Mn_{0.2}O_2$ | No | No | 95.80% | 2594 |
| Example 6 | 96% | 8 | $LiNi_{0.6}Co_{0.2}Mn_{0.2}O_2$ | No | No | 95.20% | 2234 |
| Example 7 | 98% | 8 | $LiNi_{0.6}Co_{0.2}Mn_{0.2}O_2$ | No | No | 94.10% | 1832 |
| Example 8 | 94% | 8 | $LiNi_{0.5}Co_{0.2}Mn_{0.3}O_2$ | No | No | 95.80% | 2591 |
| Example 9 | 94% | 8 | $LiNi_{0.5}Co_{0.25}Mn_{0.25}O_2$ | No | No | 95.65% | 2605 |
| Example 10 | 94% | 8 | $LiNi_{0.33}Co_{0.33}Mn_{0.33}O_2$ | No | No | 96.40% | 3052 |
| Example 11 | 94% | 8 | $LiNi_{0.6}Co_{0.2}Mn_{0.2}O_2$ | B | No | 95.70% | 2556 |
| Example 12 | 94% | 8 | $LiNi_{0.6}Co_{0.2}Mn_{0.2}O_2$ | B | Al | 96.10% | 2843 |
| Comparative example 1 | 94% | 4 | $LiNi_{0.6}Co_{0.2}Mn_{0.2}O_2$ | No | No | 92.10% | 1105 |
| Comparative example 2 | 94% | 20 | $LiNi_{0.6}Co_{0.2}Mn_{0.2}O_2$ | No | No | 89.10% | 712 |
| Comparative example 3 | 88% | 8 | $LiNi_{0.6}Co_{0.2}Mn_{0.2}O_2$ | No | No | 88.90% | 1030 |
| Comparative example 4 | 99% | 18 | $LiNi_{0.6}Co_{0.2}Mn_{0.2}O2$ | No | No | 88.30% | 604 |

Test Result Analysis:

1. As can be seen from the analysis of Examples 1-4 and Comparative Examples 1-2:

When the D50 of the negative material was not within the scope of the present application, the battery cycle performance was remarkably reduced. In Examples 1-4, it was found that when the graphitization degree was constant, the battery cycle performance was gradually decreased with the increase of the average particle size of the material, preferably in the range of 6-12 μm.

2. As can be seen from the analysis of Examples 2, 5-7 and Comparative Examples 3-4:

When the graphitization degree of the negative material was not within the scope of the present application, the battery cycle performance was remarkably deteriorated. In Examples 2 and 5-7, it can be seen that when the average particle size of the material was constant, the battery cycle performance was gradually decreased with the increase of graphitization degree, preferably in the range of 92% to 96%.

3. As can be seen from the analysis of Examples 2 and 11-12,

When the positive material was doped and/or coated, the cycle performance of the battery can be further improved.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. A lithium ion secondary battery comprising a cathode, an anode, a separator and an electrolyte, wherein the anode comprises a negative current collector and a negative material layer, wherein the negative material layer comprises a negative active material which is consisting of artificial graphite having a graphitization degree of 94% to 98% and an average particle size D50 of 8 μm to 12 μam, wherein the negative material layer excludes silicon; wherein the cathode comprises a positive current collector and a positive material layer, and the positive material layer comprises a positive active material with formula $Li_xNi_aCo_bM_cO_2$, M is at least one selected from the group consisting of Mn and Al, $0.95 \leq x \leq 1.2$, $0.5 \leq a < 1$, $0 < b < 1$, $0 < c < 1$ and $a+b+c=1$; wherein the positive active material is doped with boron; and wherein the positive active material has a coating layer and the coating layer contains Al.

2. The lithium ion secondary battery according to claim 1, wherein the graphitization degree of the negative active material is 94% to 96%.

3. The lithium ion secondary battery according to claim 1, wherein the negative active material further has a coating layer and the coating layer comprises amorphous carbon.

4. The lithium ion secondary battery according to claim 3, wherein the amorphous carbon is obtained by the carbonization of at least one material selected from the group consisting of polyvinyl butyral, bitumen, furfural resin, epoxy resin or phenolic resin.

5. The lithium ion secondary battery according to claim 3, wherein the content of the amorphous carbon is 2% to 13%, based on the total weight of the negative active material.

6. The lithium ion secondary battery according to claim 3, wherein the content of the amorphous carbon is 5% to 10%, based on the total weight of the negative active material.

7. The lithium ion secondary battery according to claim 1, wherein the content of the negative active material is 92% to 98%, based on the total weight of the negative material layer.

8. The lithium ion secondary battery according to claim 1, wherein the content of the positive active material is 92% to 98%, based on the total weight of the positive material layer a conductive carbon coating modified above material, a conductive metal coating modified above material or a conductive polymer coating modified above material.

* * * * *